(12) United States Patent
Fedorova et al.

(10) Patent No.: US 7,536,556 B2
(45) Date of Patent: May 19, 2009

(54) METHOD AND DEVICE FOR ENTERING A COMPUTER DATABASE PASSWORD

(76) Inventors: Yulia Vladimirovna Fedorova, 39, Pyatnizkaya Street, A6, Moscow (RU) 109017; Thomas Robert Ruddy, 401 Holland La., Suite 314, Alexandria, VA (US) 22314; Martyn Sergeevich Nunuparov, Korp. 1133-159, Zelenograd, Moscow (RU) 103460

(*) Notice: Subject to any disclaimer, the term of this patent is extended or adjusted under 35 U.S.C. 154(b) by 651 days.

(21) Appl. No.: 10/484,711

(22) PCT Filed: Jul. 27, 2001

(86) PCT No.: PCT/RU01/00315

§ 371 (c)(1),
(2), (4) Date: Jan. 26, 2004

(87) PCT Pub. No.: WO03/010641

PCT Pub. Date: Feb. 6, 2003

(65) Prior Publication Data

US 2004/0172564 A1    Sep. 2, 2004

(51) Int. Cl.
*H04L 9/00* (2006.01)
(52) U.S. Cl. .................. 713/183; 713/182; 725/30; 726/27
(58) Field of Classification Search .................. None
See application file for complete search history.

(56) References Cited

U.S. PATENT DOCUMENTS 5,559,961 A    9/1996  Blondet 6,421,453 B1 *   7/2002  Kanevsky et al. ............ 382/115
2002/0109677 A1*  8/2002  Taylor ......................... 345/173
2002/0188872 A1* 12/2002  Willeby ....................... 713/202

FOREIGN PATENT DOCUMENTS

| EP | 0444351 A2 | 9/1991 |
| EP | 621532 A1 | 10/1994 |
| JP | 06-214954 | 8/1994 |
| JP | 10097500 | 4/1998 |
| KR | 2000-0049481 | 8/2000 |
| RU | 2126168 C1 | 2/1999 |

* cited by examiner

*Primary Examiner*—Pramila Parthasarathy
(74) *Attorney, Agent, or Firm*—Stanzione & Kim, LLP

(57) ABSTRACT

The invention relates to computers, more particularly to a method and apparatus for entering a password to gain access to computer databases. The object of the invention is to provide efficient protection of the user's password from reproduction by an unauthorized person, to substantially increase the number of possible combinations and to create passwords that are maximum easy for the users to memorize. An embodiment of the invention comprises entering parameters of a password entry dynamic image to a computer; displaying to the user the dynamic image with the selected parameters; pointing at least one predetermined object of the dynamic image that has taken a user-predetermined position in space and/or state in time. Another embodiment comprises setting a predetermined access code in the form of a rhythmic pattern; preliminary entering said rhythmic pattern via a user's entry device to a computer to store and use the rhythmic pattern in subsequent password entries; when entering the password, entering said rhythmic pattern via a set of contact means of the user's entry device.

20 Claims, 4 Drawing Sheets

METHOD AND DEVICE FOR ENTERING A COMPUTER DATABASE PASSWORD

FIELD OF THE INVENTION

The present invention relates to computers and specifically relates to a method for entering a password to gain access to computer databases and an apparatus for implementing the method.

BACKGROUND OF THE INVENTION

A method is known for entering a graphical password which requires a user to touch, via a mouse, areas of a graphical image on a display in a predetermined sequence (U.S. Pat. No. 5,559,961, IPC G06F 11/00, published on Sep. 24, 1996).

The password, however, suffers from insufficient security. Firstly, an unauthorized person can oversee and repeat the process of entering data of the password. Secondly, the number of password patterns that could be generated is small and the patterns are easy to produce by trial and error. In addition to the insufficient security, the prior art method suffers one problem more—not every password selected by the user can be easily memorized. To gain access to numerous databases, the user must remember a plurality of different password patterns, which becomes impossible due to abundance of such systems.

A method is also known for entering a password, involving the use of changing graphical images, such as digits, which requires a user to perform logical operations, such as subtraction, on images of digits that are displayed and conceived (JP Patent No. 6-214954, IPC G06K 15/00, 3/02, published on Aug. 5, 1944). Security provided by the method is quite high, but the required additional logical operations increase load on the user.

SUMMARY OF THE INVENTION

The object of the present invention is to provide a method and apparatus for entering a password to gain access to computer databases, that would overcome the aforementioned problems of the prior art. The present invention provides the following technical result: efficient protection of the user's password from reproduction by an unauthorized person, substantially increased number of possible combinations to prevent learning the password by trial and error, and at the same time provision of passwords that are maximum easy for the users to memorize and convenient to enter.

The above technical result is attained in a method for entering a password to gain access to a computer database, in accordance with the present invention, comprising the steps of: determining parameters of a password entry dynamic image; entering said parameters via a user's entry device to a computer and storing the parameters; displaying to the user on a display said dynamic image with the user-determined parameters; pointing, via time pointing means, at least one predetermined object of the dynamic image that has taken a user-predetermined position in space and/or state in time; comparing the stored parameters of the password entry dynamic image with parameters of said pointed objects of the dynamic image and, responsive to correspondence between said parameters, identifying the password.

The dynamic image is preferably a set of several screens, each having a time-variable state, wherein appearance of said predetermined object on at least one predetermined screen is pointed via the user's time pointing device, the state of the screen being preferably periodically varied.

The parameters of the dynamic image are preferably selected from the group including a number of screens, a number of objects displayed on each of the screens, a state modification mode of each of the screens, a state modification rate of each of the screens, an indication of the order and screen on which the objects of the dynamic image are to be selected, an indication which of the screens are significant for entering the password, and combinations of the said parameters.

The dynamic image may be an animated image including animated objects that vary position in space and/or state in time, wherein appearance of a predetermined object in at least one position and/or state is pointed via the user's time pointing device. The parameters of the dynamic image are selected from the group including a number of animated objects, an animation rate of the objects, an indication in order the animated objects are to be selected, and an indication which of the animated objects are significant for entering the password.

The above technical result is also attained in an apparatus for entering a password to gain access to a computer database, in accordance with the present invention, comprising: a user's entry device for entering parameters of a password entry dynamic image; a display for displaying to the user the dynamic image with the user-selected parameters; time pointing means for pointing at least one predetermined object of the dynamic image that has taken a user-predetermined position in space and/or state in time; means for storing the entered parameters of the password entry dynamic image, comparing said stored parameters with parameters of the pointed objects of the dynamic image and, responsive to correspondence between said parameters, identifying the password.

The time pointing means preferably comprises at least one contact means to point the time when actuated by the user, and can be based on at least one entry device selected from the group including a mouse, a keyboard and a graphics tablet.

The apparatus for entering a password further comprises means for implementing a state variation mode of each of the screens, a state variation rate of each of the screens, an animation rate of objects of the dynamic image, an order of selection of objects of the dynamic image on respective screens responsive to a user-entered indication which of the actuated contact means are significant for entering the password.

The above technical result is attained in a method for entering a password to gain access to a computer database, in accordance with the present invention, comprising the steps of: setting a predetermined access code in the form of a rhythmic pattern; preliminary entering said rhythmic pattern via a user's entry device to a computer to store and use the rhythmic pattern in a subsequent password entry; when entering the password, entering said rhythmic pattern via the user's entry device; comparing the stored rhythmic pattern with the entered rhythmic pattern and, responsive to correspondence between them, identifying the password.

The rhythmic pattern is preferably a fragment of a music composition, wherein contact means in a set of contact means are assigned functions of keys of a musical instrument.

The user's entry device may comprise at least one contact means, wherein a duration of each actuation of said contact means in the sequence of actuations is determined for entering the rhythmic pattern.

Additionally, the rhythmic pattern may be a combination of long and short actuations of said contact means.

The above technical result is also attained in an apparatus for entering a password to a computer database, in accordance with the invention, comprising: a user's entry device for entering a rhythmic pattern to a computer; means for storing the pre-selected rhythmic pattern entered via the user's entry device; means for comparing the stored rhythmic pattern with a rhythmic pattern entered by the user at subsequent password entries and, responsive to correspondence between them, identifying the password.

The user's entry device is preferably selected from the group including a mouse, a keyboard and combination thereof, wherein a set of contact means for entering the rhythmic pattern is selected from said keyboard and mouse, and each element of the rhythmic pattern may correspond to actuation of one of the contact means.

Furthermore, the set of contact means may include groups of contact means having the same function so that to each element of the rhythmic pattern corresponds to actuation of any one of contact means in said group of contact means.

BRIEF DESCRIPTION OF THE DRAWINGS

The invention will become more apparent from the following detailed description of its embodiments taken in conjunction with the attached drawings in which.

DETAILED DESCRIPTION OF PREFERRED EMBODIMENTS

In a first embodiment of a method is accordance with the present invention (FIG. 1), a user predetermines a number of screens, type of images to be displayed of each of the screens, a number of objects to be displayed on each of the screens, and an order and screen on which the objects of the dynamic image are to be selected. The user further determines which contact means (e.g. left or right button of a mouse or a certain key on a keyboard, etc.) will be used to point the time of appearance of a predetermined object on a screen. The predetermined object of the dynamic image is an object that has taken a user-conceived position in space and/or state in time.

The user can further determine which of the screens are significant for entering a password and which are not, i.e. which of the screens will be used to enhance security of the password entry. Respective user's settings are registered in software.

Figure 1:
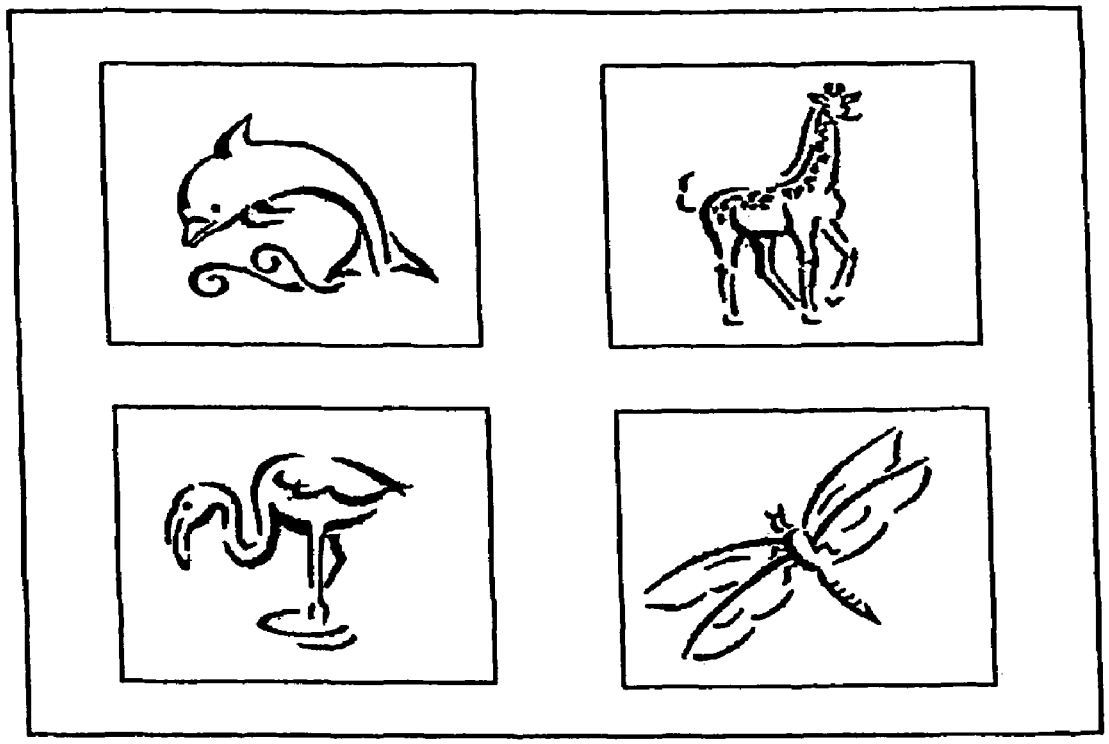
FIG. 1 illustrates a first embodiment of a method for entering a password using a set of images that are dynamically displayed on a user's computer display.

According to FIG. 1, a user is suggested to monitor appearance of graphic objects, predetermined for creating a password, on a user-defined number of screens (four in this case). The time when a user-predetermined object appears on each screen is pointed via a selected contact means, e.g. by click of the left button of a mouse or by depression of a selected key on a keyboard. Contents of each screen may change periodically, any number of times according to the user's wish and at a selected rate. By way of example, a number of pictures periodically displayed on each screen is 20. A password can be defined by the user, e.g. as follows: appearance of a tiger on the right upper screen; appearance of a parrot on the left lower screen; appearance of a shark on the left upper screen; appearance of a butterfly on the right lower screen. This means that the first time mark made by the contact means is addressed to the right upper screen; the second one is addressed to the left lower screen; the third one is addressed to the upper left screen, and the forth one is addressed to the right lower screen, which corresponds to the user-defined order of selection of the objects on respective screens. A feature of the password entry is that when pointing the time of appearance of a predetermined object the process of displaying the objects will be continued until the password is completely entered. Nothing reveals the password entry process on the display, therefore, an unauthorized person could not know the appearance of which object and on which screen is being monitored by the user, i.e. the appearance of which objects on which screens and in which order is pointed by the user.

Functions of storing the entered parameters of the password entry dynamic image, comparing said stored parameters with parameters of the pointed objects of the dynamic image and, responsive to correspondence between the parameters, identifying the password are implemented in an appropriate software.

The password entry process can be realized in a number of ways. First, selection of password objects is not mandatory on every screen, i.e. in determining a number of screens to be displayed the user may specify any number of significant screens, e.g. three. In this case, a password will consist of any three objects of the dynamic image. Second, a particular contact means may be selected to point the time of appearance of each of the objects. In this case, an exemplary password described above with reference to FIG. 1 will be as follows. If the user's password corresponds to appearance of a tiger on the right upper screen, a parrot on the left lower screen, a shark on the left upper screen and a butterfly on a right lower screen, the user may point the time of appearance of a tiger via the left button, a parrot via the right button, a shark via the left button, and a butterfly via the left button of the mouse. Therefore, the user himself selects the security of his (or her) password and complexity of its memorizing. Third, when setting a password the user may select contact means insignificant for creating the password. That is the right button of the mouse is insignificant in the described password, hence, it does not affect the password entry when depressed. This further enhances the password protection from an unauthorized viewer—in addition to the fact that the viewer does not know the appearance of which object and on which screen is being monitored by the user, he (or she) does not know whether the appearance of this object is significant for the password, i.e. whether actuation of a certain contact means is significant for the password entry.

Figure 2:
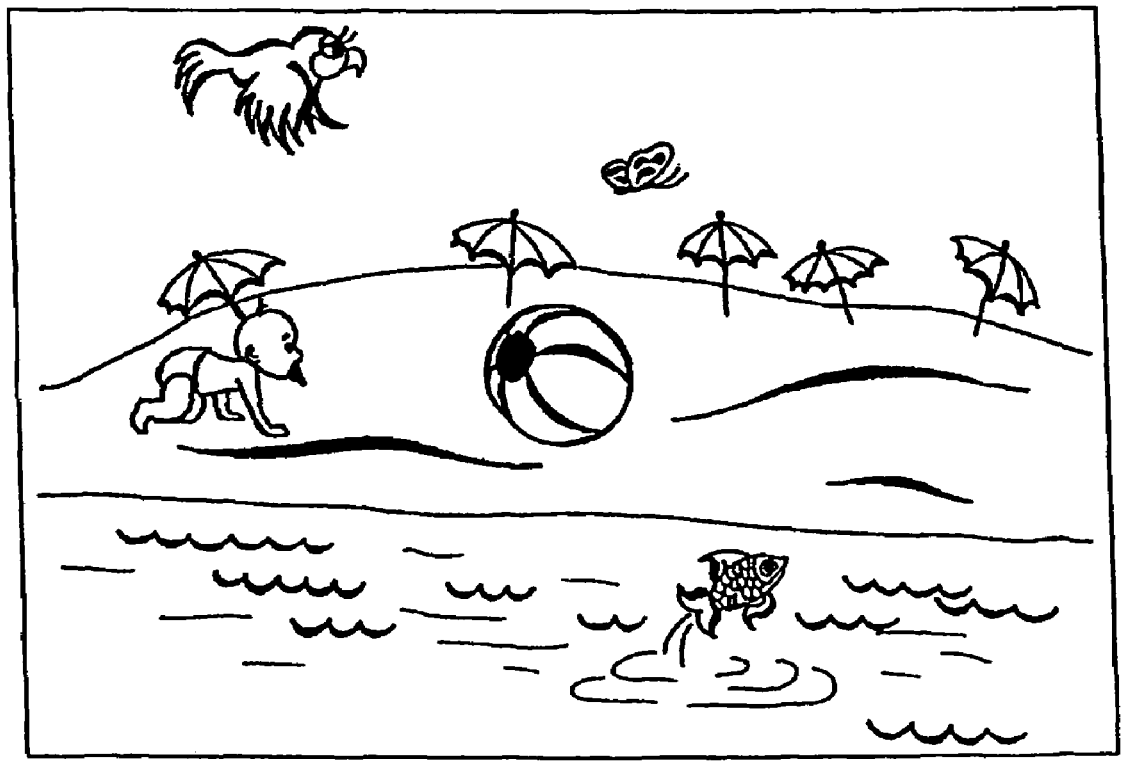
FIG. 2 illustrates a second embodiment of a method for entering a password using an image with a dynamically changing content displayed on a user's computer display.
Figure 3A:
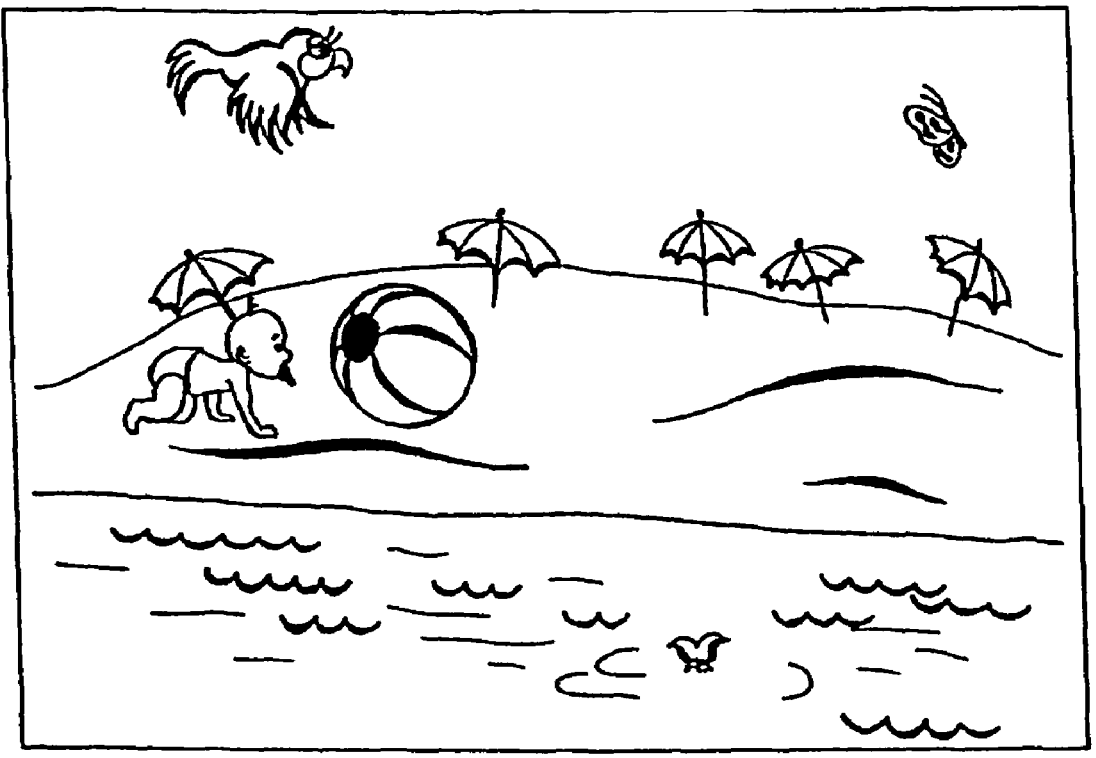
FIG. 3 represent in details the steps of a method for entering a password according to the second embodiment.
Figure 3B:
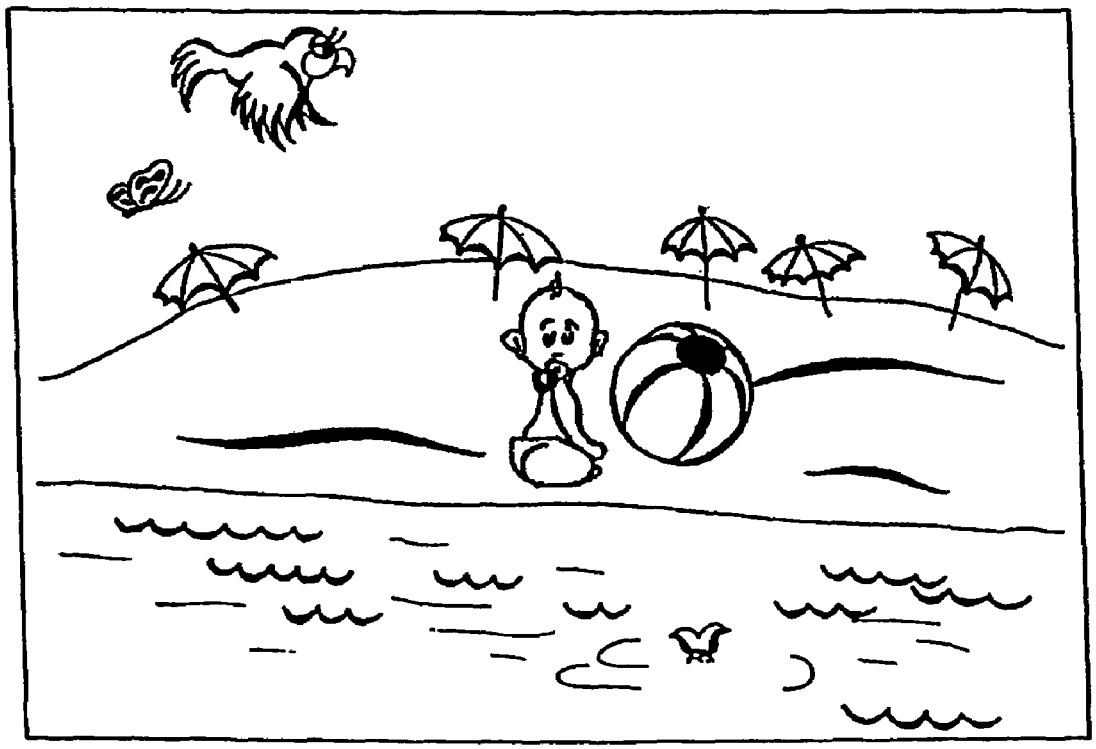
Figure 3C:
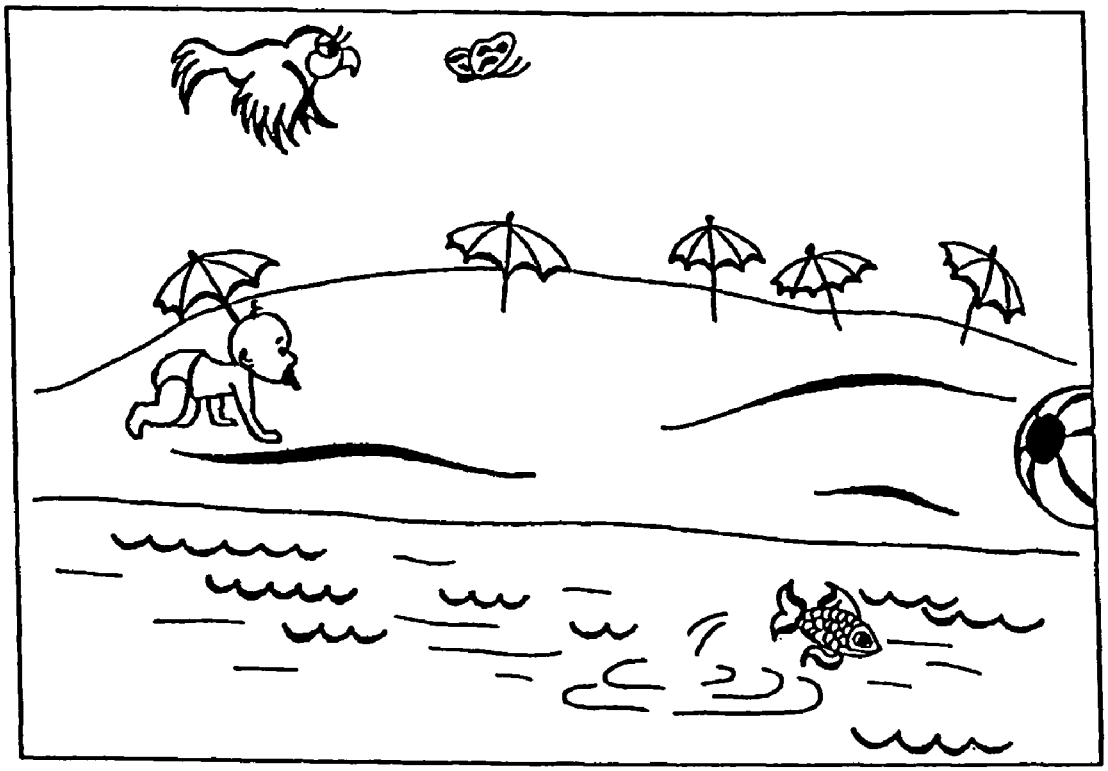
Figure 3D:
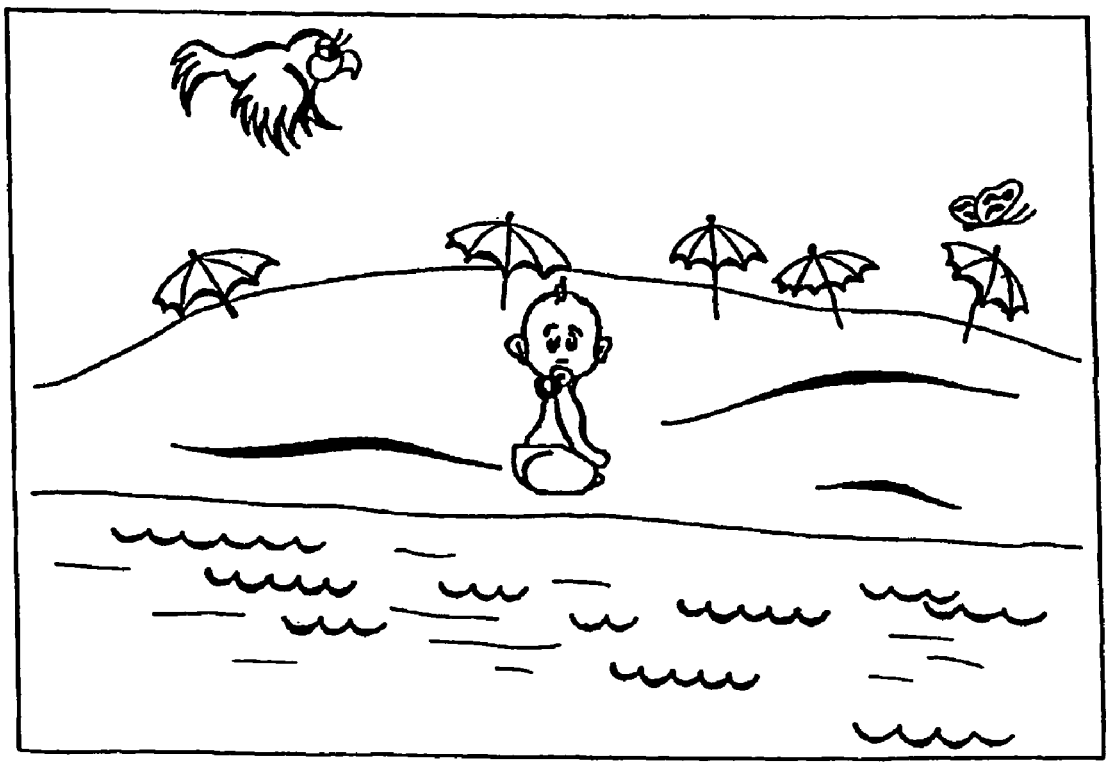
Figure 3E:
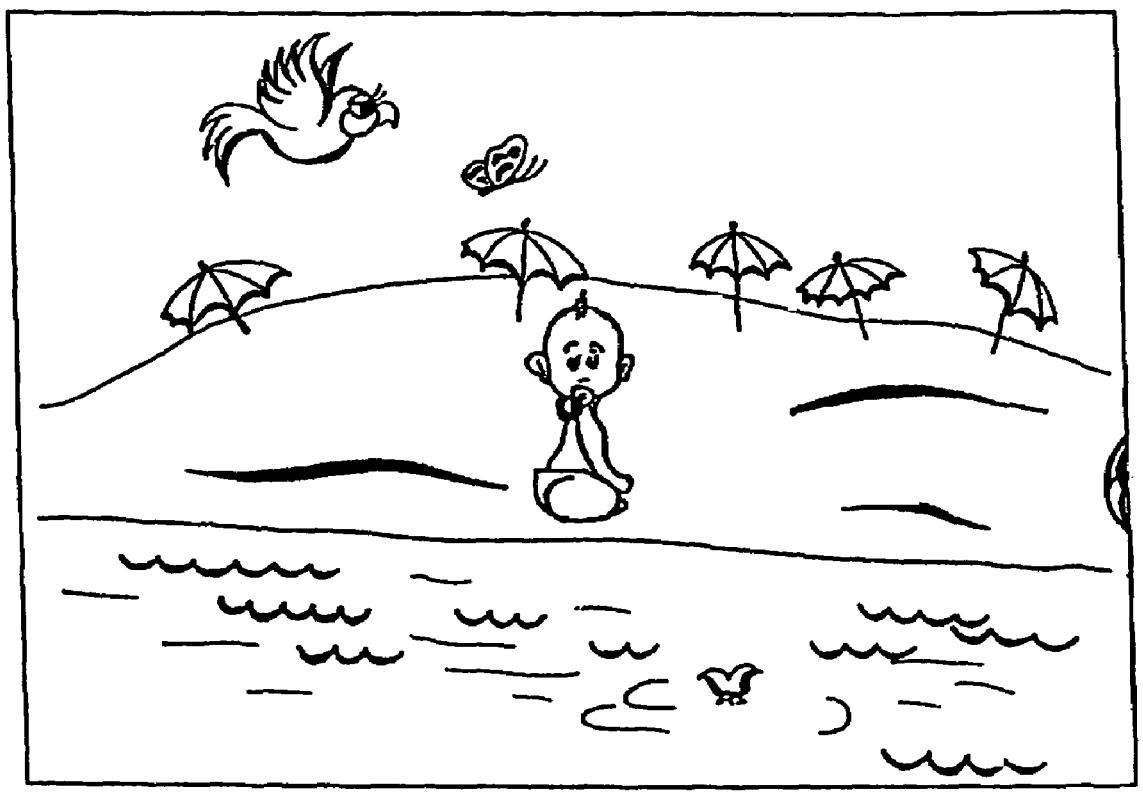

In another embodiment illustrated in FIG. 2, a user is suggested to monitor selected objects that are united in a dynamic (animated) image. According to FIG. 2, objects shown in the displayed picture, such as a child, a ball, a fish and a butterfly, change their position in space, while an object, such as a bird, changes its state, i.e. is flying, without changing its coordinates. The time when the animated objects take a predetermined position in space or a predetermined state in time is pointed by the user via any one selected time pointing device (e.g. by click of a mouse or depression of a selected key on a keyboard). The user's password may correspond to the states of the animated objects at the instants when the fish is in water with its head (FIG. 3a), the child sits still near the ball (FIG. 3b), the ball appears on the screen (FIG. 3c), the butterfly is above the rightmost umbrella (FIG. 3d) and the bird's wings are up (FIG. 3e). Therefore, the first time mark, e.g. the first click of the mouse, is addressed to the fish, the second one is addressed to the child, the third one is addressed to the ball, the forth one is addressed to the umbrella, and the fifth one is addressed to the bird, which must correspond to the user-defined order of selection of the animated objects.

A feature of the password entry is that when pointing the time of appearance of a predetermined object at a predetermined point of space or attainment by a predetermined object of a predetermined state in time, the process of displaying the animated objects will be continued until the password is completely entered. Nothing reveals the password entry process on the display, therefore, an unauthorized person will not know which position in space and/or state in time is being monitored by the user, and in which order they are pointed by the user. The animated objects are repeatedly displayed at the user-defined animation rate in the case the user has not managed to timely point a respective object in the predetermined position. All of the described features of password creation can be used: selection of all of the animated password objects on the dynamic object is not mandatory, i.e. when determining objects for the password entry the user may declare any objects to be significant.

Such functions as selection of a state modification mode of each of the screens, determination of a state modification rate of each of the screens, determination of an object animation rate of the dynamic image, an order of selection of objects of the dynamic image on respective screens responsive to the user-entered indication as to which of the actuated means are significant for the password entry, are implemented by an appropriate software.

To enter a password that represents a rhythmic pattern, the user must enter a predetermined rhythmic pattern via predetermined contact means. The rhythmic pattern may be a fragment of a music composition, and the contact means may be assigned functions of keys of a musical instrument.

By way of example, a user selects the left and right buttons of a mouse as a password entry device. The user's password can be set as follows: three depressions of the left button, two depressions of the right button, three depressions of the right button, two depressions of the left button, three depressions of the right button, one depression of the left button, one depression of the right button, one depression of the left button, one depression of the right button, and two depressions of the left button. Such a seemingly difficult-to-memorize password represents a popular melody, "Dog's waltz", played on two keys of a key-driven musical instrument. The password is hard to oversee and repeat, as the user's hand fully covers the mouse, and the fingers stay constantly on both contact means—it is difficult to realize which button of the mouse is depressed and how many times. Only the user knows the key melody which facilitates memorizing the password as a respective rhythmic pattern, and the number and order of actuations of each of the selected contact means. In creation of such a password, the user may select as contact means for the password entry any means from the group including keyboard keys, mouse buttons and combinations thereof, as well as combinations of contact means having identical functions. By way of example, to enter the aforementioned password the user may select the upper (numeric) row of the keyboard instead of the left mouse button, and the right field of the keyboard, also numeric, instead of the right mouse button. In the process of the password entry, each button in every group of buttons has identical meaning. Therefore, it is not important which of the buttons in the group is depressed, only the group—right or left—to which it belongs is of importance. This method of entering a password enhances protection from an unauthorized viewer, because the viewer not only does not "hear" the rhythmic pattern being entered, but does not know either which of the contact means corresponds, by its meaning, to each element of the code. The rhythmic pattern code may contain any number of "sounds", i.e. depressions of the contact means, depending on the user's ability to memorize it.

The user-entered rhythmic pattern is compared with the pre-stored rhythmic pattern and the password is identified responsive to correspondence between them. These functions can be implemented by a software.

In an embodiment, a rhythmic pattern may be entered as a combination of long and short actuations of user-defined contact means.

The process of entering a password in the form of a rhythmic pattern is not accompanied by displaying any images on the screen, and access to a computer database cannot be gained until the password is completely entered.

The password entry using a dynamic picture possesses the following advantages: a great number of possible combinations can be created as each of the animated objects may take a sufficient number of easily memorized positions; protection from an unauthorized person, an intruder, can be enhanced by any one of the described means or combinations thereof. Therefore, a method for entering a password in accordance with the invention overcomes basic problems encountered by the user in selection, memorizing and protection of his (or her) password for gaining access to computer databases.

The password entry using a rhythmic pattern possesses the following advantages: a great number of combinations created on the basis of popular melodies and rhythms provide easy and simple memorizing a password by user; methods for entering rhythmic patterns additionally enhance protection from an unauthorized viewer.

INDUSTRIAL APPLICABILITY

The present invention can be used to create means for entering a password to access computer databases, to provide secure access to mobile telephones, terminals of financial transaction systems, as well as in security systems of protected territories equipped with video monitors.

What is claimed is:

1. A method of entering a password to gain access to a computer database, comprising:
   determining parameters of a password entry dynamic image, entering said parameters via a user's entry device to a computer and storing said parameters;
   displaying to the user on a display said dynamic image with the user-determined parameters;
   pointing, via time pointing means, at least one predetermined object of said dynamic image that has taken a user-predetermined position in space and/or state in time;
   comparing said stored parameters of the password entry dynamic image with parameters of said pointed objects of the dynamic image and, responsive to correspondence between said parameters, identifying the passwords,
   wherein said dynamic image is an animated image including animated objects that vary position space and/or state in time appearance of a predetermined object in at least one position and/or state is pointed via the user's time pointing device, and said parameters of the dynamic image are selected from the group including a number of animated objects, an animation rate of the objects, an indication in which order the animated objects are to be selected, and an indication which of the animated objects are significant for entering the password.

2. The method of claim 1 characterized in that said dynamic image is a set of several screens, each having a time-variable state, wherein appearance of said predetermined object on at least one predetermined screen is pointed via the user's time pointing device.

3. The method of claim 2 characterized in that the state of the screen is periodically varied.

4. The method of claim 2 or 3 characterized in that said parameters of the dynamic image are selected from the group including a number of screens, a number of objects displayed on each of the screens, a state modification mode of each of the screens, a state modification rate of each of the screens, an indication of the order and screen on which the objects of the dynamic image are to be selected, an indication which of the screens are significant for entering a password, and combination of said parameters.

5. An apparatus for entering a password to gain access to a computer database, comprising
- a user's entry device for entering parameters of a password entry dynamic image to a computer;
- a display for displaying to the user the dynamic image with the user-selected parameters;
- time pointing means for pointing at least one predetermined object of the dynamic image that has taken a user-predetermined position in space and/or state in time;
- means for storing the entered parameters of the password entry dynamic image, comparing said stored parameters with parameters of the pointed objects of the dynamic image and, responsive to correspondence between the parameters, identifying the password; and
- means for implementing a state modification mode of each of the screens, a state modification rate of each of the screens, an animation rate of objects of the dynamic image, an order of section of objects of the dynamic image on respective screens responsive to a user-entered indication which of the actuated contact means are significant for entering the password.

6. The apparatus of claim 5 characterized in that said time pointing means comprises at least one contact means to point the time when actuated by the user.

7. The apparatus of claim 5 or 6 characterized in that said time pointing means is based on at least one entry device selected from the group including a mouse, a keyboard and a graphic tablet.

8. A method of entering a password to gain access to a computer database, comprising:
- setting a predetermined access code in the form of a rhythmic pattern at a corresponding time;
- preliminary entering said rhythmic pattern via a user's entry device to a computer to store and use said rhythmic pattern in a subsequent password entry;
- when entering the password, entering said rhythmic pattern at the corresponding time via said user's entry device;
- comparing said stored rhythmic pattern with the entered rhythmic pattern and, responsive to correspondence between said rhythmic patterns with respect to the corresponding time, identifying the password.

9. The method of claim 8 characterized in that said user's entry device comprises a set of contact means, wherein a predetermined number of contact means and an order of actuations of the contact means by the user are selected for entering the rhythmic pattern.

10. The method of claim 8 or 9 characterized in that said rhythmic pattern is a fragment of a music composition, wherein said contact means in said set of contact means are assigned functions of keys of a musical instrument.

11. The method of claim 8 characterized in that said user's entry device comprises at least one contact means, wherein a duration of each actuation of said contact means in the sequence of actuations thereof is determined for entering the rhythmic pattern.

12. The method of claim 8 or 11 characterized in that said rhythmic pattern is a combination of long and short actuations of said contact means.

13. An apparatus for entering a password in a computer database, comprising:
- a user's entry device for entering a pre-selected rhythmic pattern at a corresponding time to the computer;
- means for storing the pre-elected preliminary entered via an entry device;
- means for comparing said stored pre-elected rhythmic pattern with a rhythmic pattern entered at the corresponding time by the user at subsequent password entries and, responsive to correspondence between the rythmic patterns, identifying the passsword.

14. The apparatus of claim 13 characterized in that said user's entry device is selected from the group including a mouse, a keyboard and combination thereof, wherein a set of contact means for entering the rhythmic pattern is selected from said keyboard and mouse.

15. The apparatus of claim 14 characterized in that each element of said rhythmic pattern corresponds to actuation of one of the contact means.

16. The apparatus of claim 14 characterized in that aid set of contact means includes groups of contact means having the same function so that each element of said rhythmic pattern corresponds to actuation of any one of contact means in said group of contact means.

17. An apparatus to enter a password in a computer, comprising:
- an entry device to enter parameters of a password entry dynamic image to the computer;
- a display to display the dynamic image;
- a time pointing unit to point at least one predetermined object of the dynamic image that has taken a user-predetermined position in space and/or state in time; and
- a storing unit to store the entered parameters of the password entry dynamic image, to compare the stored parameters with parameters of the pointed objects of the dynamic image and, response to correspondence between the parameters, to identify the password,
- wherein the apparatus further comprises means for implementing a state modification mode of each of the screens a state modification rate of each of the screen, an animation rate of objects of the dynamic image, an order of selection of objects of the dynamic image on respective screens responsive to a user-entered indication which of the actuated contact means are significant for entering the password.

18. A method of entering a password in a computer, the method comprising:
- determining parameters of a password entry dynamic image to enter the parameters via a user entry device to the computer to store the parameters;
- displaying on a display the dynamic image with the user-determined parameters;
- pointing, via a time pointing unit, at least one predetermined object of the dynamic image that has taken a user-predetermined position in space and/or state in time; and
- comparing the stored parameters of the password entry dynamic image with parameters of the pointed objects of the dynamic image and, responsive to correspondence between the parameters, identifying the password,
- wherein the method further comprises implementing a state modification mode of each of the screens, a state modification rate of each of the screens, an animation rate of object of the dynamic image, an order of selection of objects of the dynamic image on respective screens responsive to a user-entered indication which of the actuated contact means are significant for entering the password.

19. An apparatus to enter a password in a computer, comprising:
- an entry device to enter a rhythmic pattern with respect to a corresponding time to the computer;
- a storing unit to store the pre-selected rhythmic pattern entered via the entry device; and
- a comparing unit to compare the stored rhythmic pattern with a rhythmic pattern entered with respect to the corresponding time by a user at subsequent password entries and, response to correspondence between the rhythmic patterns, identifying the password.

20. A method of entering a password in a computer, the method comprising:
- setting a predetermined access code in the form of a rhythmic pattern with respect to a time-axis;
- preliminary entering the rhythmic pattern via an entry device to the computer to store and use the rhythmic pattern in a subsequent password entry;
- entering the rhythmic pattern with respect to the time-axis via the entry device, when the password is entered; and
- comparing the stored rhythmic pattern with the entered rhythmic pattern and, responsive to correspondence between the rhythmic patterns, identifying the password.

* * * * *